(12) United States Patent
Abdulhayoglu

(10) Patent No.: US 11,322,146 B1
(45) Date of Patent: May 3, 2022

(54) LED LIGHT WITH REPLACEABLE MODULE AND INTELLIGENT CONNECTIVITY

(71) Applicant: Ezlo Innovation LLC, Clifton, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 0 days.

(21) Appl. No.: 16/844,992

(22) Filed: Apr. 9, 2020

Related U.S. Application Data

(60) Provisional application No. 62/831,985, filed on Apr. 10, 2019.

(51) Int. Cl.
| | |
|---|---|
| *F21V 23/00* | (2015.01) |
| *F21V 33/00* | (2006.01) |
| *F21K 9/232* | (2016.01) |
| *F21Y 113/10* | (2016.01) |
| *F21Y 115/10* | (2016.01) |
| *G10L 15/22* | (2006.01) |
| *H04L 12/28* | (2006.01) |
| *H04W 84/12* | (2009.01) |

(52) U.S. Cl.
CPC ............ *G10L 15/22* (2013.01); *F21K 9/232* (2016.08); *F21V 23/007* (2013.01); *F21V 33/0052* (2013.01); *H04L 12/282* (2013.01); *F21Y 2113/10* (2016.08); *F21Y 2115/10* (2016.08); *H04W 84/12* (2013.01)

(58) Field of Classification Search
CPC .......... F21K 9/232; F21K 9/235; F21K 9/238; F21V 23/007; F21V 33/0052
See application file for complete search history.

(56) References Cited

U.S. PATENT DOCUMENTS

| | | | |
|---|---|---|---|
| 2014/0203939 A1* | 7/2014 | Harrington | H05B 45/20 340/584 |
| 2014/0252958 A1* | 9/2014 | Subotnick | F21K 9/232 315/149 |
| 2016/0080615 A1* | 3/2016 | Chen | H04N 5/2256 348/77 |
| 2017/0138562 A1* | 5/2017 | Western | F21K 9/232 |
| 2018/0018866 A1* | 1/2018 | Carlin | G08B 29/043 |
| 2018/0177029 A1* | 6/2018 | Wang | G06F 3/167 |

* cited by examiner

*Primary Examiner* — William N Harris
(74) *Attorney, Agent, or Firm* — Joseph P. Aiena

(57) ABSTRACT

There is provided an LED light with a replaceable module that is connected to an intelligent network. The replaceable module includes a driver element, communication element, and power storage such as a battery. The driver element has circuitry, such as printed circuit boards, which is uniform for mating with any connection component to provide electrical connection. The communication/control element includes communication with a voice orchestrated infrastructure and to Z-link capable systems, via a wireless network. The replaceable module fits inside the opening of a housing which includes a mount for electrical connection to standard electrical outlet. Zone control LED lighting is also provided which is likewise connected to the network for voice control.

7 Claims, 8 Drawing Sheets

FIG. 2 VOI Bridge Components Diagram

FIG. 3. VOI Bridge Components Diagram

FIG. 4. VOI Bridge System Diagram

LED LIGHT WITH REPLACEABLE MODULE AND INTELLIGENT CONNECTIVITY

CROSS REFERENCE TO RELATED APPLICATIONS

This application claims benefit of and priority to U.S. Provisional Application No. 62/831,985 filed on Apr. 10, 2019 and incorporated herein by reference in its entirety.

BACKGROUND

Smart home devices provide convenience and productivity for users, but compatibility of different brands arise for each endpoint device. There is a need for smart home control which is independent of the personal assistant device that is used with the endpoint devices.

SUMMARY OF THE INVENTION

There is provided a voice orchestrated infrastructure system for use with and in creating smart homes that are controlled by one or more authorized users from a centralized hub device. For one or more of the rooms in a residence or dwelling, each of the rooms has embedded or fastened in fixtures and devices within the room, microphones and speakers which are in communication with the central hub system and also with each other through the central hub system via wi-fi networking. The system of the present invention is not dependent on any particular brand of voice controlled personal assistant device (such as Siri/Alexa/Nest).

Microphones/speakers/video are all controlled and communicated directly through one hub. Service provider that is utilized does not matter. As the voice orchestrated infrastructure is agnostic as to the system or type of personal assistant device employed by the user(s).

The system has Wi-Fi capability to talk to the hub and authorized devices. Motion detection via sound effects to activate the room devices. All privacy is controlled through the hub, along with security features. Communication system protocol—devices in each room of house or dwelling acting as a telephone.

Voice command is directed to an appropriate destination, such as a room, or particular endpoint device in a room. This includes lights, thermostats, electric outlets, appliances—washer, dryer, stove, refrigerator, oven, range, automated vacuums. Security systems for windows and doors, motion detectors, smoke detectors.

The present invention is a lighting device which comprises a removable bulb head for light emission, a plate with at least one light emitting diode (LED) element on a base which electrically contacts a connection (conductive) element with electrical connection to a replaceable module section. The replaceable module section has a driver element, a communication element, and a power storage element; said driver element having circuitry which are uniform for mating and electrically connecting with the connection element electrical connection components. The communication element includes communication with a voice orchestrated infrastructure via a wireless network. The replaceable module is contained inside an opening of a housing which includes a mount for electrical connection to an electrical outlet and the replaceable module is electrically connected to an internal surface of the mount.

The lighting device of claim 1 wherein the voice orchestrated infrastructure system comprises a hub in communication with at least one endpoint device located in a room or area, and the at least one endpoint device in communication with the hub and at least one endpoint device in a second room or area through the hub. The hub includes a non-transitory computer-readable storage medium which stores computer-executable instructions that when executed by a processor, cause the processor to perform operations for determining the voice command which is communicated to and from the at least one end point device. The at least one endpoint device is activated and controlled by voice commands which are independent of service provider type and the at least one end point device communicating the voice commands to the communication element of the replaceable module.

DETAILED DESCRIPTION

Figure 1:
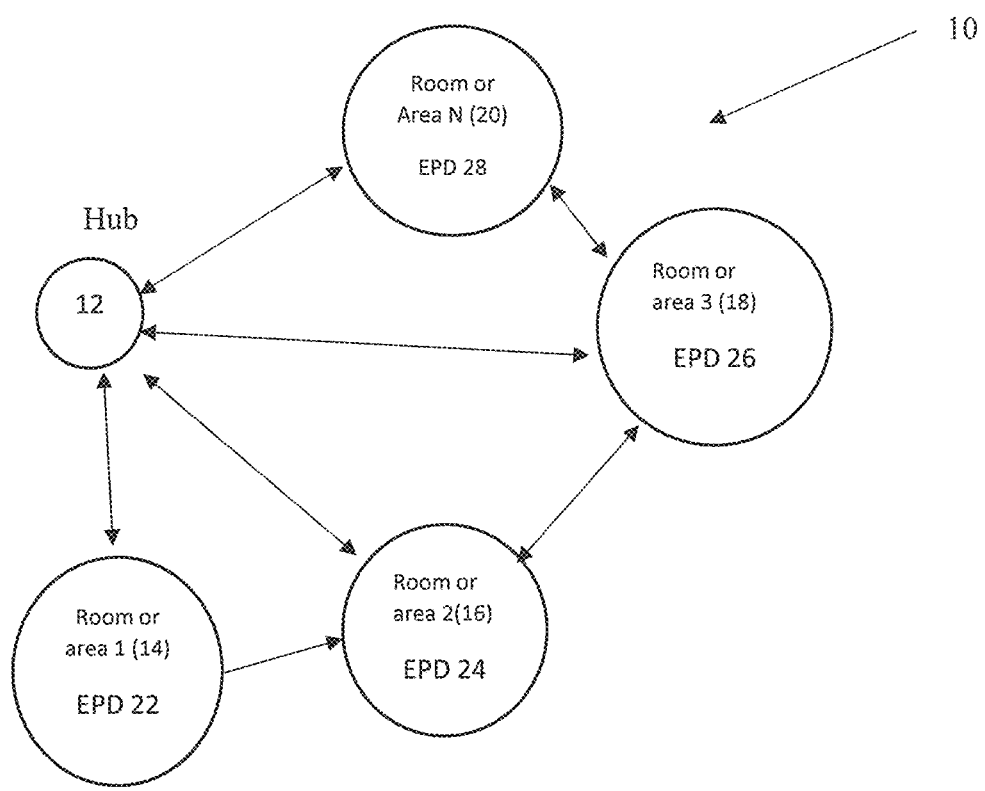
FIG. 1 is an illustration of a hub connected to one or more rooms each with endpoint devices.

As illustrated in FIG. 1 for the present invention 10, each of the Room or area 1 (14), Room/area 2 (16), and Room/area 3 (18) and a plurality of other rooms or areas, designated as room or area N (20), are connected and in communication to the hub 12, with each room or area having one or more endpoint devices (EPD) 22, 24, 26, and 28, such a light switches, outlets, appliances etc. All endpoints 22, 24, 26, and 28 are voice orchestrated or controlled and have microphones and speakers at the endpoints 22, 24, 26, and 28 for communication with, from and back to the hub 12. Through the hub 12, communication can be made to and from any room 14, 16, 18 or 20 for activating or deactivating or adjusting/controlling any device or endpoint 22, 24, 26, and 28 in the room. The system 10 can be synched and controlled with laptop or hand held devices as well whether by voice control or applications. Proprietary software and rules are designed for the hub and system to execute the system of the present invention.

Figure 2:
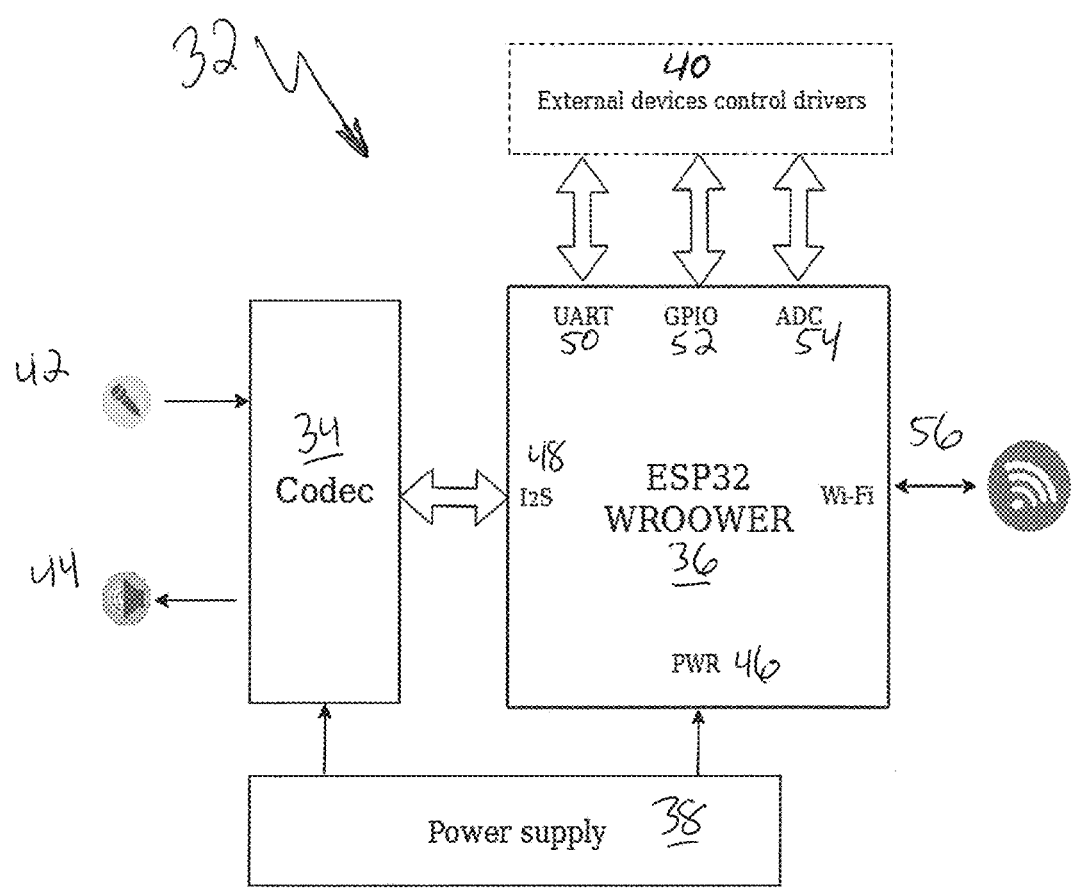
FIG. 2 is a schematic of the voice orchestrated infrastructure bridge components.

Bridge Description:

Referring to FIG. 2, there is shown the VOI bridge components 32. The VOI bridge is a small-sized device based on Espressif ESP-32 chip (eXtensa ESP32) 36. The bridge 32 consisting an array of MEMS microphones 42 connected to an audio codec 34 and an ESP32 Wi-Fi/BT enabled 32 bit microcontroller. The MEMs microphone array on the bridge allows you to leverage voice recognition in your app creations by using the latest online cognitive services including Microsoft Cognitive Service, Amazon Alexa Voice Service, Google Speech API, Wit.ai and Houndify. The bridge provides to users the opportunity to integrate custom voice and hardware-accelerated machine learning technology right onto the silicon. It's for makers, industrial and home IoT engineers. It allows for triggering events based on sound detections, such as receiving a text message when your dog is barking back home. One of the examples of working with bridge—you can build your own Amazon's Alexa using the Bridge 32. Bridge contains the following peripherals: ac/dc power converter 38, 46; general purpose input/output 52, universal asynchronous receiver transmitter (UART) 50, analog-digital converter (ADC) 54, voice/sound streaming information 42, 44, 48; network interface; status indicators; control buttons; low power drivers for control external devices 40 (optional); may have wireless 56 interfaces on-board such as Bluetooth/ZigBee/Z-Wave (optional). External audio codec 34 is used for input/output 42, 44 and coding/decoding of voice/sound information 48. Bridge can work/have internal and external microphones and built-in speaker.

In an embodiment, the end points 22, 24, 26, 28 include a voice proximity sensor and can also be combined with an amplification sensor for the sound wave, as well as at least one directional sensor. In this manner, an individual speaking a command (such as "turn lights on" or "turn lights off") can direct the command to a specific endpoint 22, 24, 26, 28 within a room or a specific room as they enter or leave in order to distinguish from an endpoint in the adjacent room.

Figure 3:
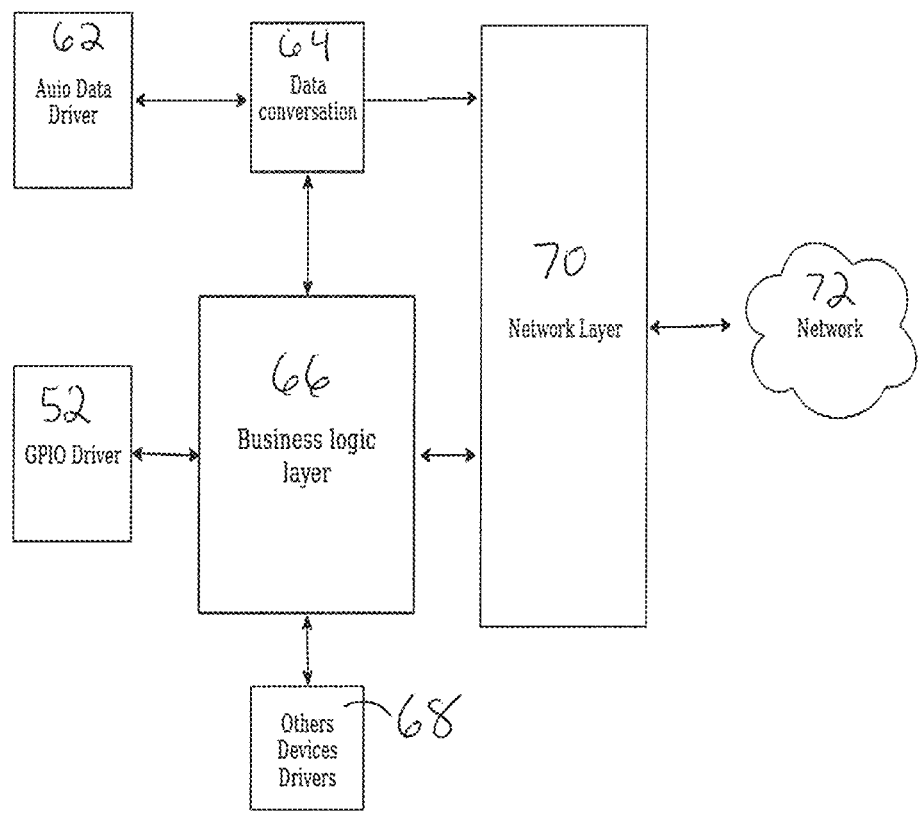
FIG. 3 is a diagram of the bridge components showing drivers, logic layers, and network layers.

Bridge Functions:

The present invention includes perception of voice commands, coding, transmitting to remote voice web-service 84 (Amazon Alexa, Google Assistant, etc.) using protected HTTP connection. This includes: receiving, uncoding, unpacking and playing of sound/voice response from remote voice web-service. There is also the receiving of REST-requests from own web-service (NMA) and control of devices with the help of GPIO's 52 pins or using wireless interfaces. See FIG. 3 to reference the audio data driver 62, communicating and transmitting to data conversion 64 which is in communication with the network layer 70 and business logic layer 66. The business logic layer 66 communicates with the GPIO driver 52 and other device drivers 68. The business logic layer also communicates with the network layer 70 which is in communication with the network 72.

Figure 4:
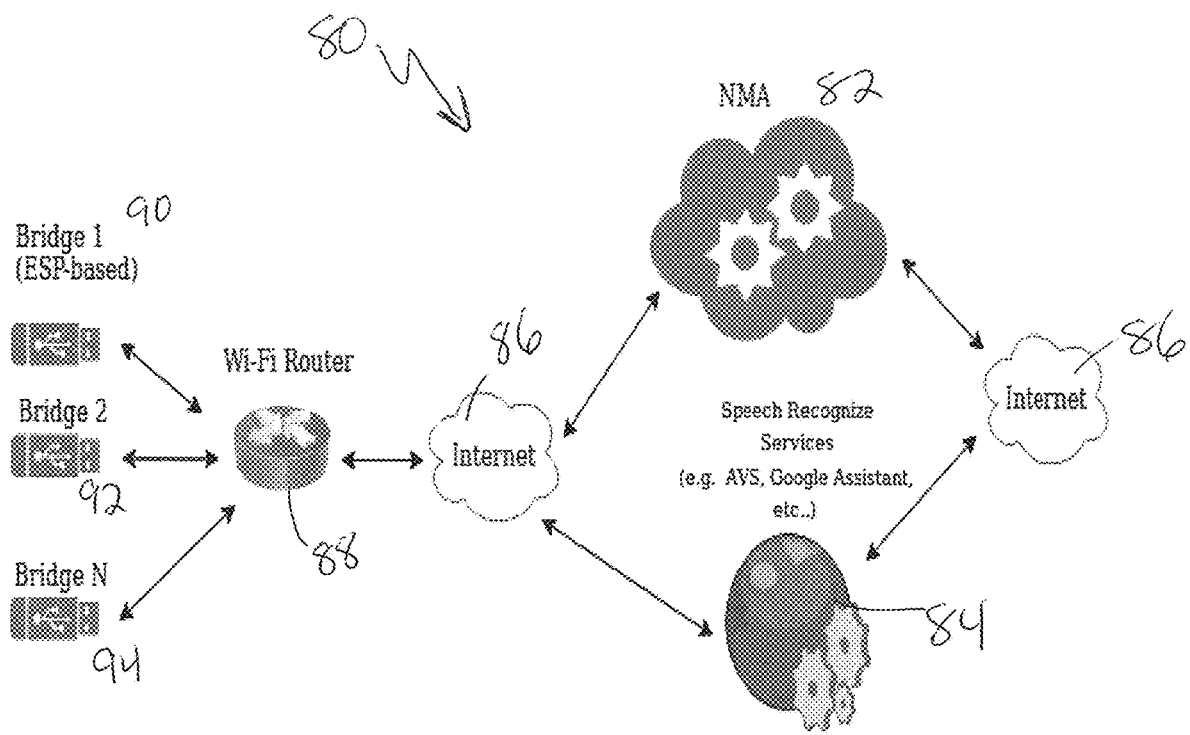
FIG. 4 is a diagram of the bridge system components.

NMA Functions:

Referring to FIG. 4, there is shown the bridge system diagram 80. This bridge system includes a multitude of ESP based bridges 90, 92, 94 connected and communicating with a Wi-Fi router 88 in connection to the internet 86. Communication with an NMA 82 and a speech recognition services 84 to and from the internet 86 is also provided.

NMA 82 is a web service that contains event handlers for voice web services. It handles requests from a remote voice web service (Amazon Alexa, Google Assistant, etc) 84. It sends REST bridge requests according to its own business logic, which is based on processing events from a remote voice web service.

Functions of the Remote Voice Web Service.

This service has the functionality to recognize voice information, the formation of a voice response based on intellectual processing of input data (contains intellectual voice chat) and also contains easily configurable voice command handlers (e.g. Alexa Skills) and NMA web service management.

Working Flow:

After power supply to the bridge, the device enters the standby mode of initialization, which is displayed by the indicator. The device is initialized by pressing the "mic" button or by pre programmed wake-up word. In the initial initialization mode, the bridge raises the access point with the SSID (brige_xxxxx). This is necessary to configure the basic parameters such as WIFI AP and voice web service account 84. Setup is performed using a mobile IOS/Android application. The user installs the mobile application. The mobile device must be connected to the WIFI AP bridge. After successful setting, the bridge disables the access point. To reset the settings, you must hold the "reset" button.

The configured bridge connects to the NMA 82 and also has a connection to the remote voice web service 84. After successfully connecting to the NMA 82, the bridge is waiting for the wake-up voice command word. The user has the ability to customize the wake-up word voice command using a mobile application. User information will be stored in the bridge ROM in encrypted form. The key for encryption is located in a secure section of the flash. These states are accompanied by light/sound indication.

The user initiates voice control of bridge by the wake-up word. After processing of wake-up word, the bridge goes into the mode of transmitting voice information to the voice service. A voice communication session has a specified timeout upon completion of which commands are not transmitted to the voice service. For subsequent sessions, you must repeat the pronunciation of wake-up word. Initialization of communication sessions is accompanied by a light/sound indication. The voice service receives voice information from the bridge, processes the request, sends an audio response to the bridge, and, if necessary, transmits the necessary request to the NMA. NMA in turn controls the bridge. (See FIG. 4)

Figure 5:
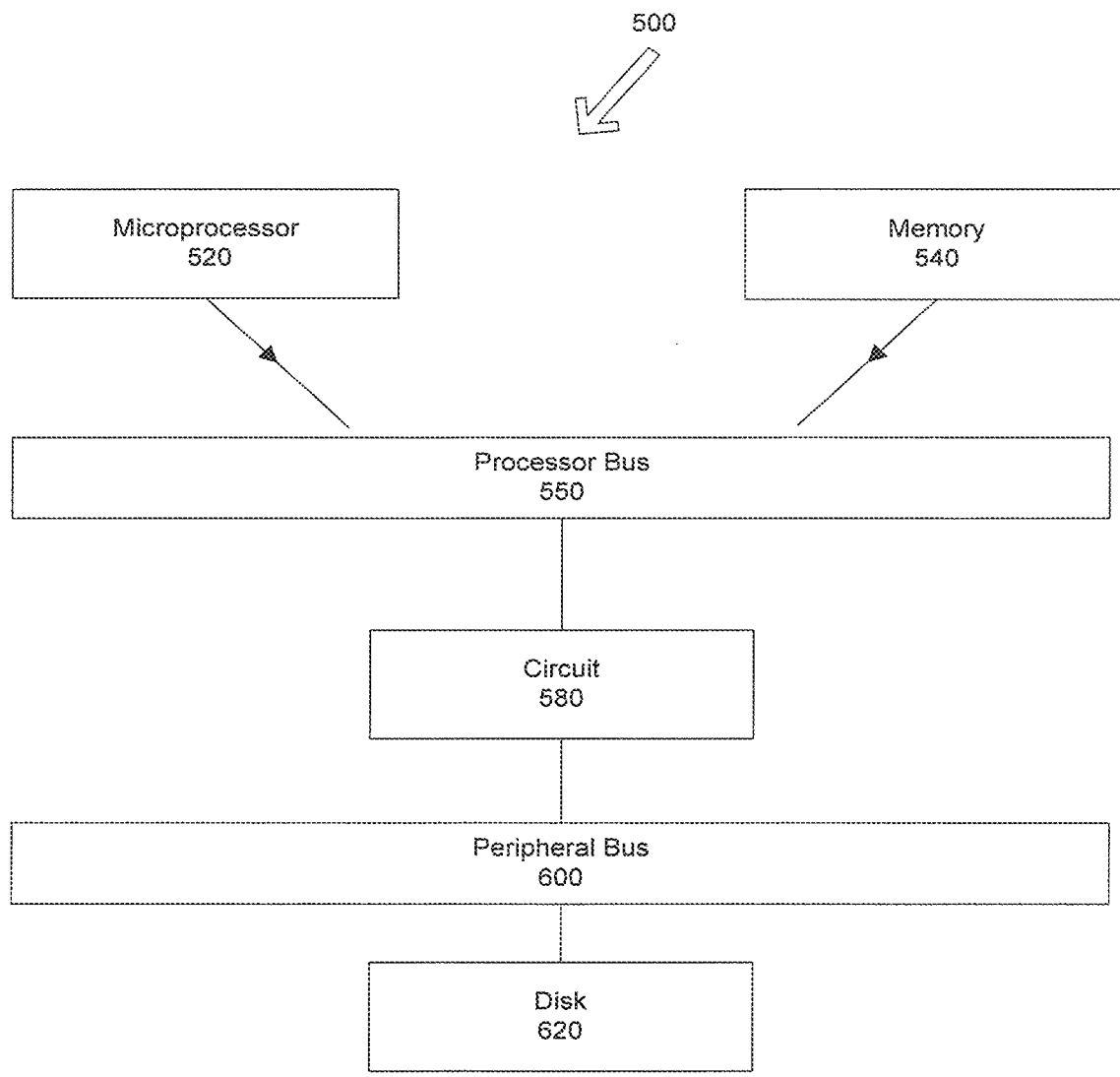
FIG. 5 is a schematic of the computer device components of the present invention.

FIG. 5 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

Figure 6:
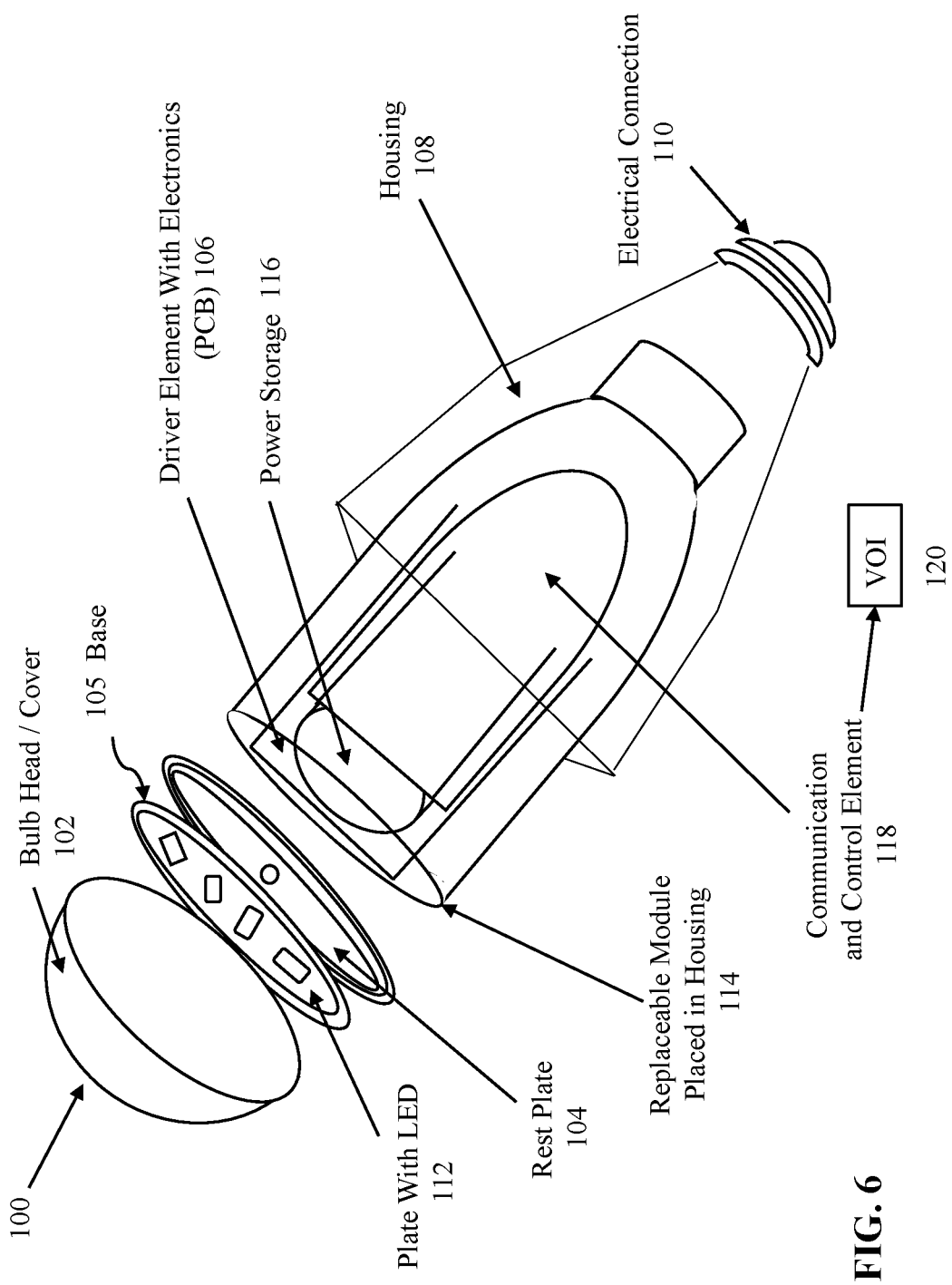
FIG. 6 is an assembly diagram of the LED light device of the present invention.
Figure 7:
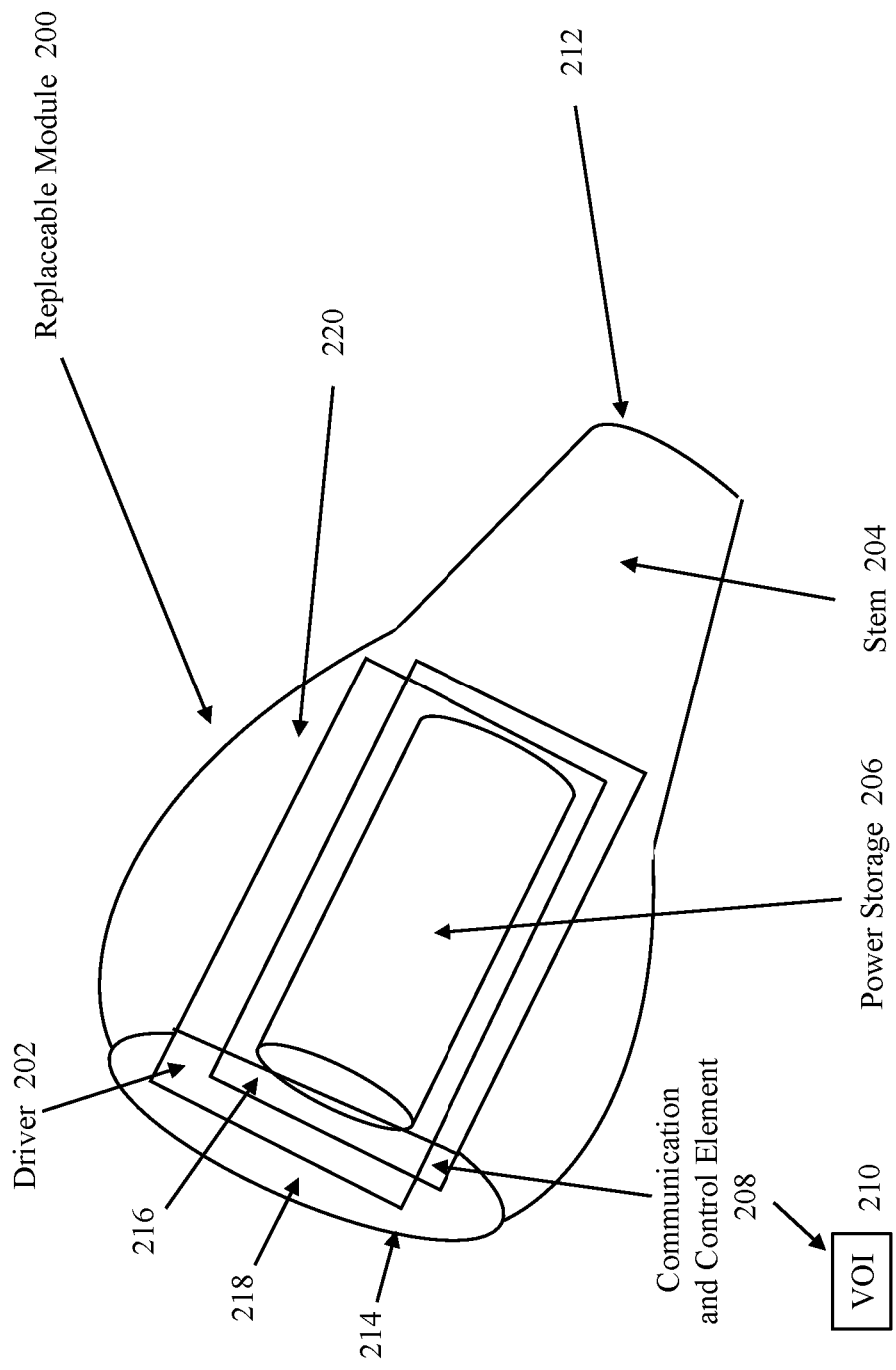
FIG. 7 is a schematic of the replaceable module of the present invention.

There is provided an LED light with a replaceable module that is connected to an intelligent network, including the voice orchestrated infrastructure described herein. As shown in the accompanying FIGS. 6 and 7, the LED light 100 of present invention includes a bulb head or cover 102 for light emission; a plate 112 with one or more light emitting diodes (LED) elements on a base 105 which rests upon connection (conductive) element, such as a rest plate 104 or has electrical connection with the replaceable module section 114. There should be multiple LED elements present, but a minimum of at least three pieces.

The replaceable module 200 includes a driver element 106 or 202, communication element 118 or 208, and power storage 116 or 206 such as a battery. These are positioned inside a cavity 216 within the replaceable module 200 after placement through a top opening 218 of the module 200. The opening 218 is formed by a rim 214 and leads to the inner cavity 216 which stores the driver element 106, 202 and communication element 118, 208, power storage 116, 206. The driver element 106 or 202 has circuitry, such as printed circuit boards, which are uniform for mating with any connection component to provide electrical connection. The communication/control element 118 and 208 includes communication with a voice orchestrated infrastructure 120 and 210 and to Z-link capable systems, via a wireless network. The replaceable module 200 fits inside the opening of a housing 108 which includes a mount for electrical connection 110 to standard electrical outlet. The internal surface of the mount electrically connects with the replaceable power module 200, preferably at or near a stem section 204 of the module 200, located at one end or bottom 212 of the replaceable module 200. The stem section 204 has a continuous surface and is integrally formed with the outer surface 220 of the cavity section.

Upon burn out/end of life of the replaceable power module, this module element 200 is removed from the light assembly and replaced. Some typical specifications for the present invention would include the following: a wattage of 8 watts to 120 watts; usable with 50 Hz, 240 Volt power supply; and a luminous efficiency of greater than 90 lm/W. These specifications are not meant to be limiting in any regard as other specifications are within the scope of the present invention.

Figure 8:
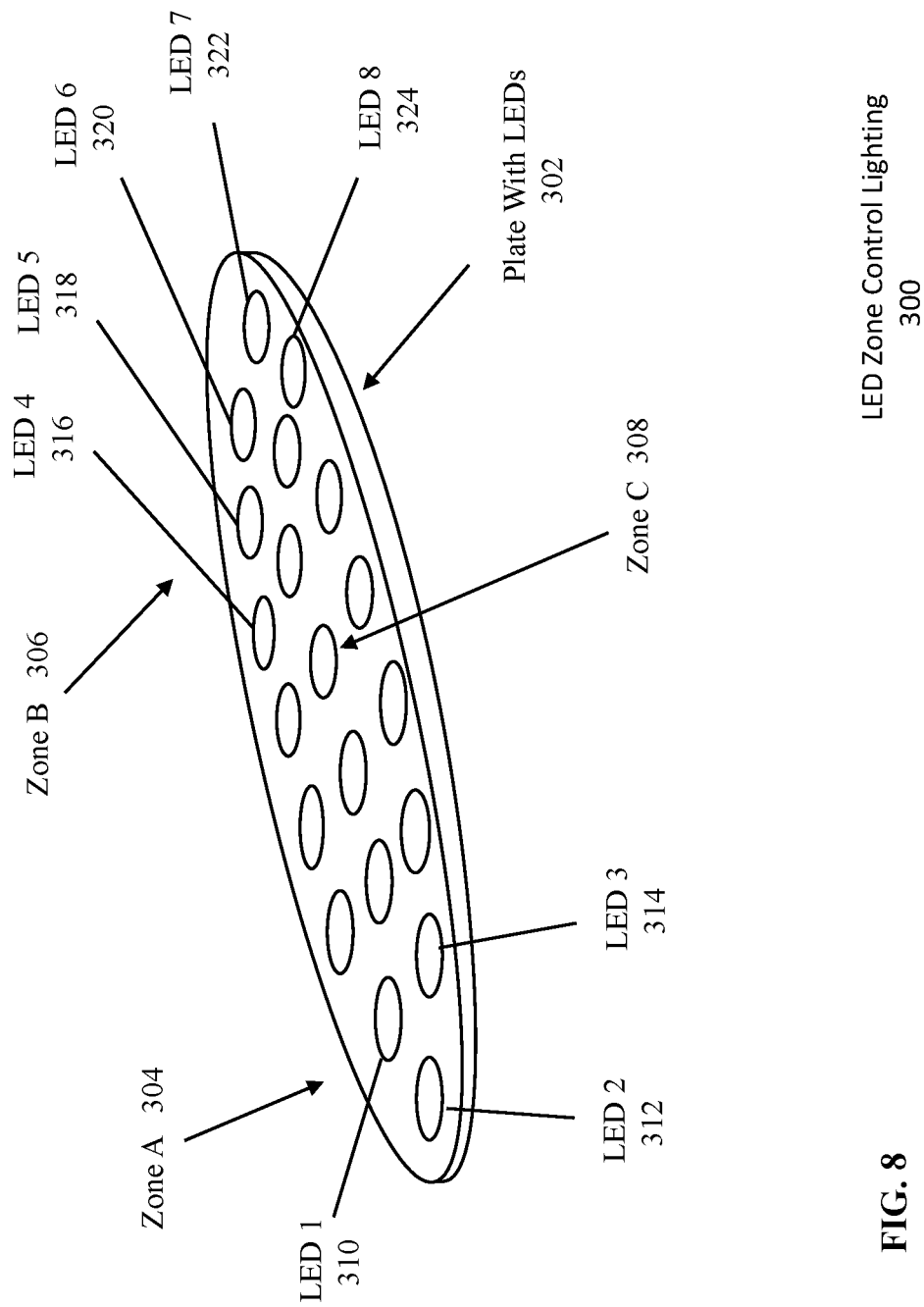
FIG. 8 is a schematic diagram of the LED zone control lighting of the present invention.

There is also provided an embodiment of the present invention in which LED zone control lighting 300 is established. As illustrated in FIG. 8, there is an LED plate having multiple LEDs 302. In the diagram shown, there are also multiple zones A (304), B (306), and C (308) on the plate 302. Each of these zones A, B, and C (304-308) have an associated set of LEDs positioned within the zone and on the plate. For example, LEDs (1-3) (310, 312, and 314) are located within Zone A on a first side area of the plate and LED4, LED5, LED6, LED7, LED8 (316, 318, 320, 322, and 324) are located in Zone B on a second side area of the plate. Similarly, additional LED's are located in central Zone C. The LED's are all connected electronically as previously noted to the replaceable module. By having zone controlled lighting, the LEDs in a particular zone of A, B, or C (304, 306 or 308 respectively), or a combination thereof, may be chosen to illuminate by the user's input and control. In this manner, lighting may be selectively and directionally positioned by the controller/user. The use of different color LEDs in each of the zones A, B, or C (304, 306, 308) can provide the user with additional options for directional colors with the lighting. Different brightness capability may be included as well. Each of these options are included through the connections to the voice orchestrated infrastructure and Z-link capable systems. For example, if the user only wants Zone A LEDs for lighting, then the LEDs 1 through 3 (310, 312, 314) would be activated and illuminated and not the other LEDs. Similarly, if the user wants Zone B LEDs for lighting, then only LEDs 4, 5, 6, 7, and 8 (316, 318, 320, 322, 324) would be activated and illuminated. This provides direction illumination from each of these respective zones.

The LED of the present invention is designed to be compatible with Power over Ethernet (POE) systems for transmission of data and electric.

The intelligent connectivity of the present invention is described with reference to a voice orchestrated infrastructure system 120 and 210. This allows for voice control of the LED light (s) with the replaceable module of the present invention. This communication occurs through Wi-Fi or Z-Wave enabled connections and circuitry in the replaceable module.

There is provided herein a description of a voice orchestrated infrastructure system for use with and in creating smart homes that are controlled by one or more authorized users from a centralized hub device. The LED light with replaceable module is usable in this system as an endpoint.

For one or more of the rooms in a residence or dwelling, each of the rooms has embedded or fastened in fixtures and devices within the room, microphones and speakers which are in communication with the central hub system and also with each other through the central hub system via wi-fi networking.

The system of the present invention is not dependent on any particular brand of voice controlled personal assistant device (such as Siri/Alexa/Nest).

Microphones/speakers/video are all controlled and communicated directly through one hub. Service provider that is utilized does not matter. As the voice orchestrated infrastructure is agnostic as to the system or type of personal assistant device employed by the user(s).

The system has Wi-Fi capability to talk to the hub and authorized devices. There is also motion detection via sound effects to activate the room devices, and all privacy is controlled through the hub, along with security features. The communication system protocol provides for devices in each room of house or dwelling to act as a telephone.

Voice command is directed to an appropriate destination, such as a room, or particular endpoint device in a room. This includes lights, thermostats, electric outlets, appliances—washer, dryer, stove, refrigerator, oven, range, automated vacuums. It also includes security systems for windows and doors, motion detectors, smoke detectors.

What is claimed is:

1. A lighting device comprising, a removable bulb head for light emission;

a plate with at least one light emitting diode (LED) element, the plate provided on a base, said base electrically contacting a conductive connection element with an electrical connection to a replaceable module section, said at least one LED element compatible with power over ethernet systems for transmission of data and electric;

said replaceable module section having a driver element, a communication element, and a power storage element; said driver element having circuitry which is uniform for mating and electrically connecting with electrical connection components of said connection element;

said communication element includes communication with a voice orchestrated infrastructure via a wireless network;

said replaceable module section contained inside an opening of a housing which includes a mount for electrical connection to an electrical outlet; said replaceable module section electrically connected to an internal surface of the mount.

2. The lighting device of claim 1 wherein said voice orchestrated infrastructure comprises, a hub in communication with a first at least one endpoint device located in a room or area, said first at least one endpoint device in communication with said hub and a second at least one endpoint device in a second room or area through said hub, said hub having a non-transitory computer-readable storage medium which stores computer-executable instructions that, when executed by a processor, cause the processor to perform operations for determining the voice command which is communicated to and from one or more of said first and said second at least one endpoint device;

said one or more of said first and said second at least one endpoint device is activated and controlled by voice commands which are independent of service provider type;

said one or more of said first and said second at least one endpoint device communicating said voice commands to said communication element of said replaceable module section.

3. The lighting device of claim 1 wherein said plate with said at least one light emitting diode element includes at least two zones on said plate, with each of said at least two zones having an associated set of light emitting diodes positioned within each of said at least two zones on said plate.

4. The lighting device of claim 1 wherein said plate with said at least one light emitting diode element includes at least one light emitting diode element which is capable of selective positioning.

5. The lighting device of claim 1 wherein said plate with said at least one light emitting diode element includes at least one light emitting diode element which is capable of directional positioning.

6. The lighting device of claim 1 wherein said plate with said at least one light emitting diode element includes at least one light emitting diode element which is selected to illuminate by user input.

7. The lighting device of claim 1 wherein said plate with said at least one light emitting diode element includes a first light emitting diode element of a first color and a second light emitting diode element of a second color.

* * * * *